(12) United States Patent
Acker

(10) Patent No.: US 6,322,917 B1
(45) Date of Patent: Nov. 27, 2001

(54) DIAGNOSTIC METHOD AND CONTROL OF PREFERENTIAL OXIDATION OF CARBON MONOXIDE

(75) Inventor: William P. Acker, Rexford, NY (US)

(73) Assignee: Plug Power L.L.C., Latham, NY (US)

( * ) Notice: Subject to any disclaimer, the term of this patent is extended or adjusted under 35 U.S.C. 154(b) by 0 days.

(21) Appl. No.: 09/406,674

(22) Filed: Sep. 27, 1999

(51) Int. Cl.⁷ .................................................... H01M 8/06
(52) U.S. Cl. ................................. 429/17; 429/19; 429/23
(58) Field of Search .............................. 429/17, 19, 23

(56) References Cited

U.S. PATENT DOCUMENTS

| | | | |
|---|---|---|---|
| 4,530,886 | 7/1985 | Sederquist | 429/13 |
| 4,537,839 | 8/1985 | Cameron | 429/20 |
| 4,751,151 | 6/1988 | Healy et al. | 429/17 |
| 4,766,044 | 8/1988 | Sederquist | 429/19 |
| 4,859,545 | 8/1989 | Scheffler et al. | 429/17 |
| 4,879,189 | 11/1989 | Snopkowski | 429/13 |
| 4,910,099 | 3/1990 | Gottesfeld | 429/13 |
| 5,006,425 | 4/1991 | Takabayashi | 429/23 |
| 5,322,744 | 6/1994 | Koseki | 429/13 |
| 5,334,463 * | 8/1994 | Tajima et al. | 429/23 X |
| 5,432,020 | 7/1995 | Fleck | 429/13 |
| 5,432,021 | 7/1995 | Wilkinson et al. | 429/17 |
| 5,441,819 | 8/1995 | Voss et al. | 429/13 |
| 5,441,821 | 8/1995 | Merritt et al. | 429/17 |
| 5,482,680 | 1/1996 | Wilkinson et al. | 422/177 |
| 5,527,632 | 6/1996 | Gardner | 429/27 |
| 5,543,238 | 8/1996 | Strasser | 429/17 |
| 5,637,415 | 6/1997 | Meltser et al. | 429/17 |
| 5,677,073 | 10/1997 | Kawatsu | 429/22 |
| 5,702,838 | 12/1997 | Yasumoto et al. | 429/40 |
| 5,712,052 | 1/1998 | Kawatsu | 429/13 |
| 5,786,104 | 7/1998 | Black et al. | 429/13 |
| 5,853,910 | 12/1998 | Tomioka et al. | 429/17 |
| 5,945,229 | 8/1999 | Meltser | 429/13 |
| 6,001,499 * | 12/1999 | Grot et al. | 429/23 X |
| 6,007,931 | 12/1999 | Fuller et al. | 429/13 |
| 6,159,626 * | 12/2000 | Keskula et al. | 429/23 X |

FOREIGN PATENT DOCUMENTS

WO 99/05741   2/1999   (WO).

OTHER PUBLICATIONS

Hirschenhofer et al., *Fuel Cell Handbook*, Fourth Edition, Nov. 1998, pp. 2–21–2–27.

Inbody et al., Transient Carbon Monoxide Control for PEM Fuel Cell Systems, Fuel Cell Seminar, Nov. 16–19, 1998, Palm Springs, CA, pp. 1–4.

Kadowaki et al., Influence of Reformed Gas on PEFC Performance, Fuel Cell Seminar, Nov. 16–19, 1998, Palm Springs, CA, pp. 1–4.

Zawodzinski, Jr. et al., Reformate Tolerance in Polymer Electrolyte Fuel Cells: Experimental and Modeling Studies, Fuel Cell Seminar, Nov. 16–19, 1998, Palm Springs, CA, pp. 1–4.

Nitin S. Kapur et al., "An Investigation of Polarization Effects in Porous Electrodes" 1998 Fuel Cell Seminar, Monday, Nov. 16–Thursday Nov. 19, 1998, Palm Springs, California.

* cited by examiner

*Primary Examiner*—Stephen Kalafut
(74) *Attorney, Agent, or Firm*—Fish & Richardson,P.C.

(57) ABSTRACT

A diagnostic method and method of controlling the preferential oxidation of CO in a reformed fuel gas stream includes periodically modulating the amount of air supplied to a preferential oxidation reactor at a specific operating characteristic of the fuel cell, such as power output or fuel flow rate, to determine the amount of air necessary to reduce the level of CO to an acceptable level.

22 Claims, 2 Drawing Sheets

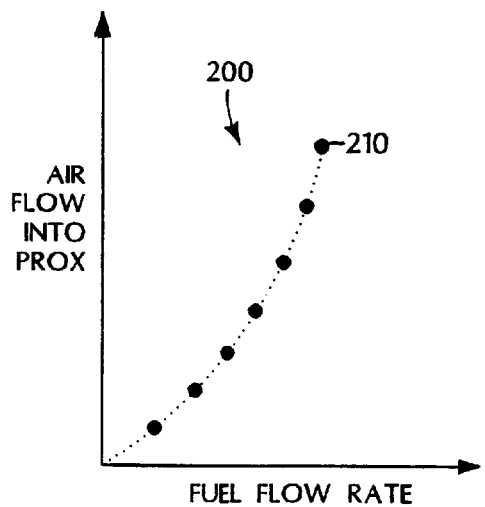
FIG. 2
FIG. 3
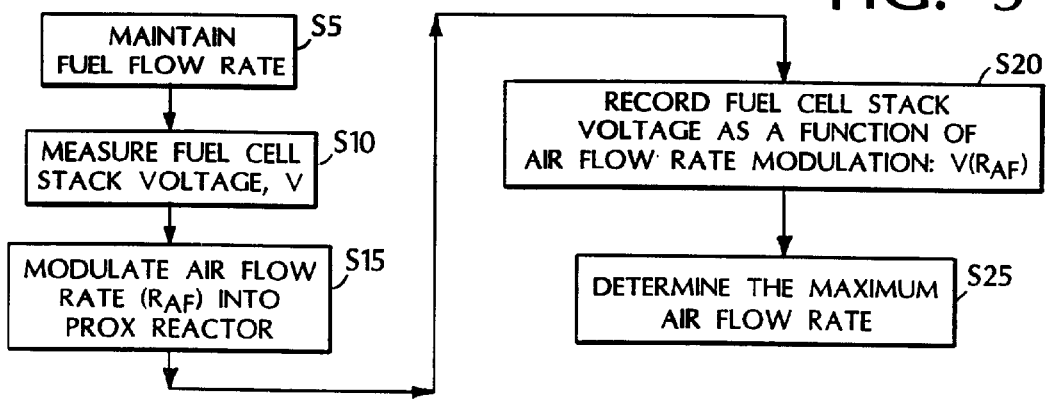
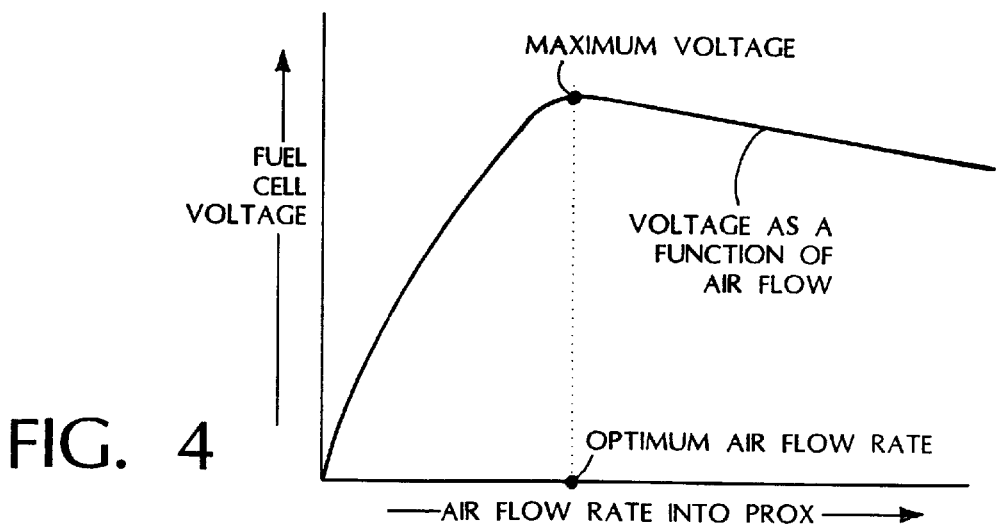
FIG. 4

DIAGNOSTIC METHOD AND CONTROL OF PREFERENTIAL OXIDATION OF CARBON MONOXIDE

This invention relates generally to fuel cells and more specifically to a diagnostic method and method of controlling the preferential oxidation of carbon monoxide in the fuel stream for a fuel cell.

BACKGROUND OF THE INVENTION

A fuel cell can convert chemical energy to electrical energy by promoting a chemical reaction between two reactant gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the reactant gases to the membrane electrode assembly.

The membrane electrode assembly usually includes a solid electrolyte (e.g., a proton exchange membrane) between a first catalyst and a second catalyst. One gas diffusion layer is between the first catalyst and the anode flow field plate, and the other gas diffusion layer is between the second catalyst and the cathode flow field plate.

During operation of the fuel cell, one of the reactant gases (the anode reactant gas) enters the anode flow field plate at the inlet region of the anode flow field plate and flows through the channels of the anode flow field plate toward the outlet region of the anode flow field plate. The other reactant gas (the cathode reactant gas) enters the cathode flow field plate at the inlet region of the cathode flow field plate and flows through the channels of the cathode flow field plate toward the cathode flow field plate outlet region.

As the anode reactant gas flows through the channels of the anode flow field plate, the anode reactant gas passes through the anode gas diffusion layer and interacts with the anode catalyst. Similarly, as the cathode reactant gas flows through the channels of the cathode flow field plate, the cathode reactant gas passes through the cathode gas diffusion layer and interacts with the cathode catalyst.

The anode catalyst interacts with the anode reactant gas to catalyze the conversion of the anode reactant gas to reaction intermediates. The reaction intermediates include ions and electrons. The cathode catalyst interacts with the cathode reactant gas and the reaction intermediates to catalyze the conversion of the cathode reactant gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and reactant gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode reactant gas undergoes oxidation during the fuel cell reaction. Because electrons are consumed at the cathode side of the membrane electrode assembly, that means the cathode reactant gas undergoes reduction during the fuel cell reaction.

For example, when hydrogen and oxygen are the reactant gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

Hydrogen gas typically is produced by a reformer which reforms methanol or other hydrocarbons, such as natural gas, into hydrogen ($H_2$), carbon dioxide ($CO_2$), and other byproducts, such as carbon monoxide (CO). As known in the art, reforming methods include steam reforming, catalytic partial oxidation, and autothermal reforming. The reformed fuel stream contains high levels of carbon monoxide (greater than 10,000 ppm) which "poisons" the anode catalyst of the fuel cell by binding to the fuel cell catalyst thereby inhibiting hydrogen fuel from being oxidized. Typically achieving levels that are less than 100 ppm of CO in the reformed fuel stream is necessary to avoid catalyst poisoning of the fuel cell.

In order to reduce the concentration of CO to lower levels, the reformed fuel stream passes through a "shift" reactor and a "PROX" reactor. In a "shift" reactor, steam and most of the CO in the reformed fuel stream react in the presence of a catalyst to produce $CO_2$ and $H_2$. The reformed fuel stream exiting the "shift" reactor includes a residual level of CO, typically between about 3,000 to about 10,000 ppm, which is preferentially oxidized by flowing the output of the "shift" reactor through the PROX reactor. The PROX reactor includes a catalyst to promote the preferential oxidation of CO by air ($O_2$) in the presence of $H_2$, but without consuming (by oxidizing) large quantities of $H_2$. The chemical reaction for the PROX reactor is shown in equation (3).

$$CO + \tfrac{1}{2}O_2 \rightarrow CO_2 \qquad (3)$$

The amount of air required for the PROX reaction typically is about 1.5 to about 4.0 times the stoichiometric amount of equation 1. If the amount of air is increased above this level, large amounts of hydrogen in the reformed fuel stream are consumed by excess $O_2$. In general, as the level of CO in the reformed fuel stream changes, the amount of air supplied to the PROX reactor must also change to compensate for either a decrease of or an increase of CO concentration.

To control the amount of air input into the PROX reactor, in one method a CO detector can monitor the level of CO in the fuel stream exiting the PROX reactor and send a signal proportional to the CO level to a computer. Based upon the level of CO, the computer adjusts the air flow into the PROX reactor to reduce the CO concentration to non-poisoning levels.

SUMMARY OF THE INVENTION

In general, in one aspect, the invention is a method of determining the amount of air necessary to reduce the level of CO in a reformed fuel stream to an acceptable level which does not poison the fuel cell catalyst. The method includes modulating the amount of air supplied to a PROX reactor at a specific operating point of the fuel cell, such as power output or fuel flow rate, and monitoring the fuel cell voltage to determine the amount of air necessary to reduce the CO concentration to an acceptable level at that specific operating point. This method typically is repeated at several operating points to generate several calibration points which are stored in a central processing unit (CPU). The CPU creates a look-up table from the calibration points to correlate a specific operating characteristic, such as fuel flow rate, to a specific air flow rate into the PROX reactor. Other operational parameters may also be modulated in addition to or in place of air flow, for example, temperature, pressure and the concentration of other reactants.

In another aspect, the invention is a method of operating a fuel cell system having a preferential oxidizer stage. The method includes calibrating the fuel cell system at different operating points by determining a target rate for injecting an oxidant into the preferential oxidizer stage for each of the operating points, storing results of calibrating the fuel system in memory, injecting oxidant into the preferential oxidizer stage, while running the fuel system to produce power, at a rate that is determined by the stored results, and while running the fuel cell system to produce power, periodically, recalibrating the fuel cell to update the stored results.

Embodiments of this aspect can include one or more of the following.

The method determines a target rate for injecting the oxidant into the preferential oxidizer stage by flowing a fuel gas including CO through the preferential oxidizer stage and into a fuel cell stack at a fuel flow rate; modulating a rate of air flow into the preferential oxidizer stage to affect the oxidation of CO; measuring a voltage output of a fuel cell stack as a function of the rate of air flowing into the preferential oxidizer stage; and determining an optimum rate of air flowing into the preferential oxidizer stage at the fuel flow rate. The maximum of the voltage output as a function of the rate of air flow determines the optimum rate of air flow.

The method can further include determining the status of the auxiliary battery supply. The step of running the fuel system to produce power includes injecting fuel into the fuel cell at rate to provide a specific power. Injecting oxidant into the preferential oxidizer stage at a rate can be determined cross-referencing the stored results to establish an optimum flow rate. Cross-referencing includes interpolating between different stored operating points. The stored results can include a series of points each relating a power output to an optimum air flow rate.

In another embodiment, the invention includes a method of determining a target rate for injecting an oxidant into a preferential oxidizer. The method includes flowing a fuel gas including CO through a preferential oxidizer and into a fuel cell stack at a fuel flow rate, modulating a rate of air flow into the preferential oxidizer to affect the oxidation of CO, measuring a voltage output of a fuel cell stack as a function of the rate of air flowing into the preferential oxidizer, and determining an optimum rate of air flowing into the preferential oxidizer at the fuel flow rate.

Embodiments of this aspect can include one or more of the following.

The optimum rate of air flow by is determined by the maximum of the voltage output as a function of the rate of air flow. The method can further including determining the status of the auxiliary battery supply.

In another aspect, a method of creating a look-up table for air injection into a preferential oxidizer includes (a) flowing a hydrogen fuel gas including CO through a preferential oxidizer and into a fuel cell stack at different fuel flow rates, (b) modulating a rate of air flow into the preferential oxidizer to affect an oxidation of CO at each fuel flow rate, (c) measuring a voltage output of the cell as a function of air flow rate into the preferential oxidizer at each predetermined fuel flow rate, and (d) determining the amount of air to be injected into the preferential oxidizer at each predetermined fuel flow rate.

In another aspect, the invention features a method of operating a fuel cell system where air is decreased to a reactor within the fuel cell system until an output voltage of a fuel cell stack decreases below an operating threshold. Air flow to the reactor is then increased to a predetermined level or by a predetermined amount or percentage. In another aspect, the output voltage can be compared to a reference voltage to provide diagnostic information or to affect the amount of air subsequently flowed to the reactor. A reference voltage can be any predetermined value, whether programmed into memory or derived from a look-up table, etc. The output voltage may be measured with respect to a single or multiple fuel cells, or with respect to a fuel cell stack. In the context of the present invention, a reactor is any fuel cell component in which a chemical or electrochemical reaction occurs. Reactors include, as examples, fuel cells, reformers, partial oxidizers, shift reactors, and preferential oxidizers.

In another aspect, the invention features a method of operating a fuel cell system where an operating parameter of a reactor within the fuel cell system is modulated until an output voltage of a fuel cell decreases below an operating threshold. The output voltage is then compared to a reference voltage to obtain a diagnostic indicator, and the operating parameter is then optimized in response to the diagnostic indicator. A diagnostic indicator can be a comparison to a predetermined or calculated value, and refers generally to the data obtained from the parameter modulation.

Embodiments of this aspect can include one or more of the following. The CPU checks the status of an auxiliary power supply before modulating the rate of air flow. The method also can include sounding a alarm or activating an emergency notification system if the measured voltage output of the cell as a function of air flow rate is below a predetermined threshold.

In another aspect, the invention features a fuel cell generator system including a fuel cell stack for providing electricity to a load, a conditioning system including catalytic reactors and flow regulators for providing a reformed fuel gas stream at a fuel flow rate to the fuel cell, a gas flow path from a fuel source through the conditioning system and to the fuel cell stack, and a controller for monitoring the output points of the fuel cell stack and including a calibrating routine to calibrate the fuel cell generator system at different operating points by determining a target rate for injecting an oxidant into the preferential oxidizer stage for each of the operating points based on the output point of the fuel cell generator system.

The conditioning system can include a reformer, a shift reactor, and a preferential oxidizing reactor. The fuel cell generator system also can include a monitoring system for sensing the output characteristics of the fuel cell stack.

In another aspect, the invention features a method of operating a fuel cell using an algorithm stored in a controller. The method includes decreasing an air flow rate to a preferential oxidizer until an output voltage of a fuel cell stack decreases below an operating threshold, and increasing the air flow rate to the preferential oxidizer.

The invention has various advantages including, but not limited to, one or more of the following. The new method of optimizing the air flow to the PROX reactor eliminates the need for expensive monitoring devices such as CO detectors. Additionally, the new method is used continuously to determine the correct air to CO mixture in the PROX reactor as the reformer, shift reactor, and PROX reactor age. Moreover, the new method recalibrates the correct air to CO mixture without using known concentrations of CO gas in the reformed fuel stream.

Other features and advantages of the invention will be apparent from the following detailed description, and from the claims.

BRIEF DESCRIPTION OF THE DRAWINGS

FIG. 2 is graphic representation of an air flow rate look-up table;

FIG. 3 is a schematic flow chart of the calibration algorithm; and

FIG. 4 is graphic representation of fuel cell voltage, at a constant fuel flow rate into the fuel conditioner, as a function of air flow rate into the PROX reactor.

DETAILED DESCRIPTION

Figure 1:
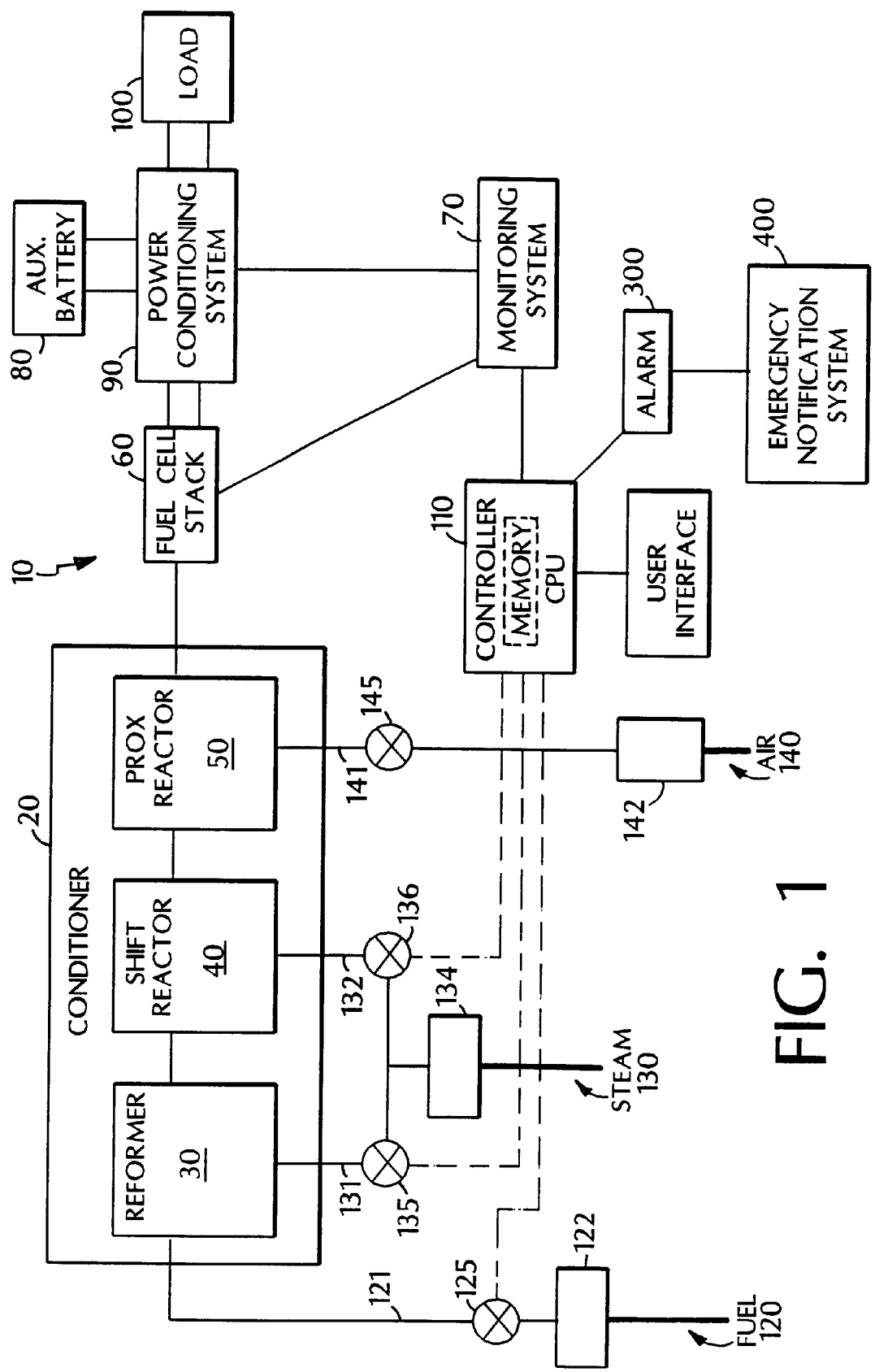
FIG. 1 is a block diagram of a fuel cell generator system.

FIG. 1 shows a block diagram of a fuel cell generator system 10 including a fuel conditioner 20 for supplying a reformed fuel stream of hydrogen gas to a fuel cell stack 60. Fuel cell stack 60 electrochemically converts the fuel into DC electricity which, in turn, is converted into AC electricity by a power conditioning system (PCS) 90. PCS 90 supplies AC electricity to a load 100, e.g., a residence. An auxiliary battery supply 80 supplies auxiliary electricity through PCS 90 whenever fuel cell stack 60 cannot provide enough electricity for the power demands of load 100. A monitoring system 70 includes sensing circuitry for monitoring the operating characteristics, e.g. power output, of fuel cell 60 through PCS 90.

Fuel conditioner 20 includes a reformer 30, a shift reactor 40, and a PROX reactor 50. During fuel cell operation, reformer 30 receives a hydrocarbon fuel 120 through conduit 121 and steam 130 through conduit 131. In the reformer, the fuel and the steam react through the aid of a catalyst to form a reformed fuel mixture of $H_2$, $CO_2$, and CO. The reformed fuel mixture passes into shift reactor 40 where CO reacts with steam 130 supplied through conduit 132 to produce $CO_2$. The shift reactor reduces the level of CO in the reformed fuel mixture, e.g., to about 10,000 ppm. The stream of $H_2$, $CO_2$, and CO from the shift reactor enters PROX reactor 50 to mix with air 140 flowing through conduit 141. The PROX reactor uses $O_2$ from the air along with a catalyst to oxidize the CO thereby reducing the level of CO in the reformed fuel mixture further, e.g., to below 50–100 ppm. The reformed fuel stream exits the conditioner and enters fuel cell stack 60.

A series of throttle valves and blowers, i.e., blower 122 and valve 125; blower 14 and valves 135, 136; and blower 142 and valve 145, are used to regulate the flow rates of fuel 120, steam 130, and air 140, respectively, into conditioner 20. Each blower and throttle valve, in turn, is controlled by a controller 110 which includes a central processing unit (CPU). Controller 110 monitors power demand and certain operating conditions of fuel cell 60, e.g., output voltage. Power demand or load is determined by monitoring current at the input of the PCS. Based on the power demand as determined by monitoring system 70, the controller establishes flow rates for the various gas streams: i.e., fuel 120, steam 130, and air 140, to support that power demand by appropriately setting the blower speed and throttle valve settings. As the power demand increases, the controller meets the demand by increasing the flow of fuel and oxidant to the fuel cell stack. The relationship between the flow rates and the power demand (as measured by current load) is defined in a look-up table that is stored in a memory accessible to the CPU. Using this table, controller 110 adjusts the flow rates as the power demand changes.

The CPU also has a routine which uses a second lookup table to determine the optimum air flow rate based upon the measured fuel flow rate. In essence, the second look-up table maps a series of fuel flow rates to corresponding air injection rates. These points define a curve which provides the relationship for all fuel flow rates over a range of operating loads. For fuel flow rates that are specified in the second table look-up table, i.e., the air flow rate table, the routine simply looks to the table to determine the optimum air flow rate. For fuel flow rates that fall between entries in the table, the routine computes the expected optimum values from the two neighboring points by interpolation.

As shown in FIG. 2, a graphic representation of the information found in a look-up table includes a series of calibration points 210 each representing an optimum air flow rate into the PROX reactor (y-axis) at a specific fuel flow rate (x-axis). An optimum air flow rate reduces the level of CO in the reformed fuel stream to avoid poisoning the catalyst in the fuel cell stack at a specific fuel flow rate. At air flow rates above the optimum flow rate, excess oxygen in the PROX reactor consumes large amounts of hydrogen which results in a decrease in the output voltage of the fuel cell stack at the specific fuel flow rate. At air flow rates below the optimum flow rate, the PROX reactor cannot efficiently oxidize CO and the catalyst in the fuel cell stack is poisoned by elevated levels of CO resulting in a decrease in the output voltage of the fuel cell stack.

As mentioned above, the CPU uses an air flow rate look-up table to determine the optimum air flow rate for a specific fuel flow rate and then sets the blower speed and/or throttle valve to achieve the required level of air injection into the PROX reactor.

The CPU establishes calibration points for the air flow rate look-up table by running a calibration algorithm stored in the controller's memory. The CPU uses the algorithm, depicted in FIG. 3, to determine an optimum air flow rate for any specific fuel flow rate. The CPU maintains a constant fuel flow rate (S5) and records the fuel cell stack output voltage (S10) as measured by the monitoring system. The CPU changes the blower speed and/or throttle valve settings (S15) to modulate the air flow rate into the PROX reactor. The CPU records the fuel stack voltage (S20) as a function of air flow rate as determined by the blower speed and/or throttle valve settings. The CPU establishes the optimum air flow rate by calculating the air flow rate that provides the maximum fuel cell stack output voltage (S25). The CPU records the calibration point by relating the specific fuel flow rate to the optimum air flow rate. The CPU also records the maximum voltage at the specific fuel flow rate. A graphic representation of the voltage as a function of air flow rate and maximum voltage is shown in FIG. 4. As discussed below, the CPU uses the maximum voltage to monitor a change in the performance of the fuel cell stack.

The CPU runs the routine of FIG. 3 for a set of individual operating points, i.e., power levels, over a range of operating points that are characteristic of the range over which the fuel cell stack would be expected to operate. The CPU uses a sufficient number of points to fairly characterize the curve which provides the relationship for all fuel flow rates over the range of operating loads. Of course, if too few points are used the interpolation between points will not accurately estimate the optimum air flow rate. On the other hand, if too many points are selected, the process is time consuming and does not significantly improve the accuracy of interpolated air flow rates.

In the described embodiment, the CPU modulates the air flow rate (S15) by changing the blower and valve settings to cover a range of air flow rates that are characteristic of the range over which air would be provided to the PROX reactor at that specific fuel flow. The CPU changes the air flow rates to cover a series points, i.e., of specific rates, within the range and changes from point to point at rate slower than the fuel cell response time. The fuel cell response time is the time that it takes the fuel cell stack voltage output to reflect a change in the reformed fuel stream. For example, for a high fuel flow rate (e.g., 200 liters per minute (LM)) and a fuel cell stack response time of 1–10 seconds, the CPU records the fuel cell stack output voltage (S20) as an air flow rate. An air flow rate of 1.1 LM could be modulated by ±20% (modulation depth) at a rate in the range from 0.05 to 0.5% per second (modulation rate). Alternatively, the CPU can modulate the air flow rate by stepping from one flow rate to another, i.e., a step function, at rate of 0.005 LM steps per second between 0.88 and 1.22 LM, for example. The numerical ranges provided are exemplary. Other rates and ranges are possible. The CPU can also modulate the air flow rate by decreasing the air flow rate until the fuel cell output voltage drops below a predetermined operating level and then increasing the air flow rate over a range of air flow rates characteristic of the range over which air would be provided to the PROX reactor at that specific fuel flow.

As conditioner 20 and fuel cell stack 60 age, contaminants and/or degradation of the catalysts alter the operating characteristics of the fuel cell generator system. As a result of aging, the calibration points in the air flow rate look-up table will no longer provide the correct relationship between a specific fuel flow rate and its corresponding optimum air flow rate causing the performance of the fuel cell at the specific fuel flow rate to decrease. Fuel cell generator system 10 periodically establishes new look-up tables by running the calibration routine described above to determine new calibration points, i.e., determining a new optimum air flow rate for a specific fuel flow rate. The CPU determines a series of new calibration points within the operating power range to provide a characteristic representation of the new relationship between fuel flow rate and air flow rate over a range of operating fuel flow rates.

The CPU memory is programmed to reestablish a new look-up table at specific times, such as each day, week, or when fuel cell stack performance falls below a level characteristic of normal operating conditions. The CPU determines fuel cell stack performance decline by constantly comparing the fuel cell stack voltage output to the optimum voltage output as determined for each calibration point. When the difference between the voltage output exceeds a predetermined threshold, the CPU runs the calibration routine to update the air flow rate look-up table.

The timing and frequency of the calibration cycle also can be controlled by the user through a CPU interface so that the CPU only runs the calibration routine at specific times, such as once a day, or under certain circumstances, such when the difference between the voltage output exceeds a threshold value. Alternatively, the user can control the CPU so that it runs the calibration routine continuously throughout the day. Whether or not the CPU is programmed to run the routine each day, continuously, or when fuel cell stack performance declines, the CPU checks the status of the auxiliary battery supply before running the calibration routine. If the load demand significantly increases during a calibration routine, the auxiliary battery supply must be able to provide the additional power to the load. The CPU receives a signal from the PCS through the monitoring system indicative of the charged state of the auxiliary battery supply. The CPU determines if the charge of the auxiliary battery is sufficient to provide enough additional power output should the load demand increase to the fuel cell stack's maximum operating load. The CPU will only initiate the calibration routine if the auxiliary battery is sufficiently charged. Additionally, the CPU can monitor the status of the auxiliary battery during the calibration routine and terminate the routine if the charge of the battery drops below a threshold sufficient to provide additional power output.

In other embodiments, the CPU can use the calibration routine to diagnose the output characteristics of the fuel cell. The system can also activate an alarm or an emergency notification system. For example, if the voltage output of the fuel cell remains below a predetermined value when modulating the air flow rate into the PROX reactor, the CPU sounds an alarm 300 (see FIG. 1), such as an indicator light or an audible alarm, or activates a emergency system 400 which pages a service repair person.

In other embodiments, the CPU can use algorithms, similar to those described above for the PROX reactor, to diagnose the performance of a fuel cell with respect to a reformer or a shift reactor. For example, the CPU can measure the voltage output of the fuel cell as a function of any one variable which affects the operation of the fuel cell system, e.g., temperature, pressure, or flow rates of different gases flowed into the reformer and the shift reactor. The system can modulate one or more variables, record the voltage of a fuel cell or fuel cell stack as a function of that variable, and compare the measured voltages to normal operating voltages values stored in controller's memory. If the difference between the measured value and the stored value is above or below a predetermined threshold, for example, the system can activate an alarm or an emergency notification system.

In other embodiments, a system can use the algorithms previously discussed alone or in combination with one or multiple fuel cell system components to provide diagnostic capabilities to monitor the performance of a fuel cell, fuel cell stack, or of a fuel processing subsystem such as a reformer or shift reactor or PROX reactor.

It should be understood that the foregoing description is intended to illustrate and not limit the scope of the invention, which is defined by the following claims. Other aspects, advantages, and modifications are within the scope of the following claims.

What is claimed is:

1. A method of operating a fuel cell system that includes a preferential oxidizer stage, said method comprising:

calibrating the fuel cell system at different operating parameters by determining a target rate for injecting an oxidant into the preferential oxidizer stage for each of the operating parameters;

storing results of calibrating the fuel system in memory;

while running the fuel system to produce power, injecting the oxidant into the preferential oxidizer stage at a rate that is determined by the stored results; and while running the fuel cell system to produce power, periodically, recalibrating the fuel cell to update the stored results.

2. The method of claim 1, wherein determining a target rate for injecting the oxidant into the preferential oxidizer stage includes:

flowing a fuel gas including CO through the preferential oxidizer stage and into a fuel cell stack at a fuel flow rate, modulating a rate of air flow into the preferential oxidizer stage to affect the oxidation of CO, measuring a voltage output of a fuel cell stack as a function of the rate of air flowing into the preferential oxidizer stage, and determining an optimum rate of air flowing into the preferential oxidizer stage at the fuel flow rate.

3. The method of claim 2, wherein the step of determining the optimum rate of air flow includes determining the maximum of the voltage output as a function of the rate of air flow.

4. The method of claim 2, further including determining the status of an auxiliary battery supply.

5. The method of claim 1, wherein running the fuel system to produce power includes injecting fuel into the fuel cell at rate to provide a specific power.

6. The method of claim 5, wherein injecting oxidant into the preferential oxidizer stage at a rate that is determined by the stored results includes cross-referencing the stored results to establish an optimum flow rate.

7. The method of claim 6, wherein the step of cross-referencing includes interpolating between different stored operating parameters.

8. The method of claim 1, wherein the stored results include a series of parameters each relating a power output to an optimum air flow rate.

9. A method of determining a target rate for injecting an oxidant into a preferential oxidizer, the method comprising:

flowing a fuel gas including CO through a preferential oxidizer and into a fuel cell stack at a fuel flow rate, modulating a rate of air flow into the preferential oxidizer to affect the oxidation of CO, measuring a voltage output of a fuel cell stack as a function of the rate of air flowing into the preferential oxidizer, and determining an optimum rate of air flowing into the preferential oxidizer at the fuel flow rate.

10. The method of claim 9, wherein the step of determining the optimum rate of air flow includes determining the maximum of the voltage output as a function of the rate of air flow.

11. The method of claim 9, further including determining the status of an auxiliary battery supply.

12. A method of creating a look-up table for injecting air into a preferential oxidizer, the method comprising:

(a) flowing a hydrogen fuel gas including CO through a preferential oxidizer and into a fuel cell stack at different fuel flow rates, (b) modulating a rate of air flow into the preferential oxidizer to affect an oxidation of CO at each fuel flow rate, (c) measuring a voltage output of the cell as a function of air flow rate into the preferential oxidizer at each predetermined fuel flow rate, and (d) determining the amount of air to be injected into the preferential oxidizer at each fuel flow rate.

13. The method of claim 12, further including checking the status of an auxiliary power supply before modulating the rate of air flow.

14. The method of claim 12, further including sounding a alarm if the measured voltage output of the cell as a function of air flow rate is below a predetermined threshold.

15. The method of claim 12, further including activating an emergency notification system if the measured voltage output of the cell as a function of air flow rate is below a predetermined threshold.

16. A fuel cell generator system comprising:

a fuel cell stack for providing electricity to a load, a conditioning system including catalytic reactors and flow regulators for providing a reformed fuel gas stream at a fuel flow rate to the fuel cell, a gas flow path from a fuel source through the conditioning system and to the fuel cell stack, and a controller for monitoring the output parameters of the fuel cell stack and including a calibrating routine to calibrate the fuel cell generator system at different operating parameters by determining a target rate for injecting an oxidant into the preferential oxidizer stage for each of the operating parameters based on the output parameter of the fuel cell generator system.

17. The fuel cell generator system of claim 16, wherein the conditioning system includes a reformer, a shift reactor, and a preferential oxidizing reactor.

18. The fuel cell generator system of claim 16, further including a monitoring system for sensing the output characteristics of the fuel cell stack.

19. A method of operating a fuel cell using an algorithm stored in a controller, the method comprising:

using the algorithm stored in the controller to decrease an air flow rate to a preferential oxidizer until an output voltage of a fuel cell stack decreases below an operating threshold, and using the algorithm stored in the controller to increase the air flow rate to the preferential oxidizer.

20. A method of operating a fuel cell system using an algorithm stored in a controller, the method comprising:

using the algorithm stored in the controller to decrease an air flow rate to a preferential oxidizer within the fuel cell system until an output voltage of a fuel cell stack decreases below an operating threshold, and using the algorithm stored in the controller to increase the air flow rate to the preferential oxidizer.

21. A method of operating a fuel cell system, the method comprising:

decreasing an air flow rate to a preferential oxidizer within the fuel cell system until an output voltage of a fuel cell decreases below an operating threshold, comparing the output voltage to a reference voltage, and increasing the air flow rate to the preferential oxidizer.

22. A method of operating a fuel cell system, the method comprising:

modulating an operating parameter of a preferential oxidizer within the fuel cell system until an output voltage of a fuel cell decreases below an operating threshold, comparing the output voltage to a reference voltage to obtain a diagnostic indicator, and modulating the operating parameter in response to the diagnostic indicator.

* * * * *

UNITED STATES PATENT AND TRADEMARK OFFICE
CERTIFICATE OF CORRECTION

PATENT NO.    : 6,322,917 B1
DATED         : November 27, 2001
INVENTOR(S)   : William P. Acker It is certified that error appears in the above-identified patent and that said Letters Patent is hereby corrected as shown below:

<u>Column 6,</u>
Line 45, "14" should be -- 134 --.

Signed and Sealed this

Twenty-ninth Day of October, 2002

Attest:

Attesting Officer

JAMES E. ROGAN
Director of the United States Patent and Trademark Office